United States Patent
Thomas et al.

(10) Patent No.: US 10,657,774 B1
(45) Date of Patent: May 19, 2020

(54) SYSTEM AND METHOD OF AUTHENTICATION USING A RE-WRITABLE CARD VERIFICATION VALUE

(71) Applicant: Wells Fargo Bank, N.A., San Francisco, CA (US)

(72) Inventors: Michael Thomas, San Francisco, CA (US); Jesse Lee, Dublin, CA (US); Steve Puffer, Champlin, MN (US); Jerome Rhodes, Hayward, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/904,832

(22) Filed: Feb. 26, 2018

Related U.S. Application Data (63) Continuation of application No. 14/546,351, filed on Nov. 18, 2014, now Pat. No. 9,905,085, which is a continuation of application No. 13/441,295, filed on Apr. 6, 2012, now Pat. No. 8,887,994.

(60) Provisional application No. 61/473,108, filed on Apr. 7, 2011.

(51) Int. Cl.
*G07F 19/00* (2006.01)

(52) U.S. Cl.
CPC .................. *G07F 19/209* (2013.01)

(58) Field of Classification Search
CPC .................................................... G07F 19/209
See application file for complete search history.

(56) References Cited

U.S. PATENT DOCUMENTS

| | | | |
|---|---|---|---|
| 3,774,743 A | | 11/1973 | Hendrickson |
| 3,996,450 A | * | 12/1976 | Kerkhoff ............... G07F 7/10 235/380 |
| 6,246,769 B1 | | 6/2001 | Kohut |
| 7,922,082 B2 | | 4/2011 | Muscato |
| 2003/0028481 A1 | | 2/2003 | Flitcroft et al. |
| 2007/0100773 A1 | | 5/2007 | Wallach |

(Continued)

FOREIGN PATENT DOCUMENTS

WO  WO 2009064197 A1 * 5/2009 ............. G06Q 20/20

*Primary Examiner* — Thien M Le
*Assistant Examiner* — Asifa Habib
(74) *Attorney, Agent, or Firm* — Foley & Lardner LLP (57) ABSTRACT

Embodiments of the method for authenticating may include causing an automated teller machine to replace a card verification value with an updated card verification value during a first transaction at the automated teller machine when a re-write condition is present, such as a request from an account holder, a determination that the security of the card was compromised during a prior transaction, a predetermined time interval has lapsed, a predetermined number of transactions have occurred since a previous time the card verification value was rewritten, and according to a predetermined geographical parameter. The updated card verification value may be stored as a current value in a verification value database. The method may include receiving a card verification request related to a second transaction, and authenticating, using verification logic, the second transaction by determining whether the card verification value for the second transaction matches the current value stored in the database.

20 Claims, 6 Drawing Sheets

(56) References Cited

U.S. PATENT DOCUMENTS

| | | |
|---|---|---|
| 2008/0110983 A1* | 5/2008 | Ashfield ............... G06Q 20/24 235/382 |
| 2008/0210754 A1 | 9/2008 | Lovett |
| 2009/0006262 A1 | 1/2009 | Brown et al. |
| 2009/0037333 A1 | 2/2009 | Flitcroft et al. |
| 2010/0082487 A1 | 4/2010 | Nelsen |
| 2011/0125634 A1 | 5/2011 | Monk |
| 2011/0131131 A1* | 6/2011 | Griffin .................. G06Q 40/00 705/38 |
| 2012/0203698 A1 | 8/2012 | Duncan et al. |

* cited by examiner

SYSTEM AND METHOD OF AUTHENTICATION USING A RE-WRITABLE CARD VERIFICATION VALUE

PRIORITY CLAIM

This application is a continuation of U.S. application Ser. No. 14/546,351 entitled "System and Method of Authentication Using a Re-Writable Card Verification Value" filed Nov. 18, 2014, which is a continuation of U.S. application Ser. No. 13/441,295 entitled "System and Method of Authentication Using a Re-Writable Card Verification Value" filed Apr. 6, 2012, now U.S. Pat. No. 8,887,994 granted Nov. 18, 2014, which claims the benefit of priority to U.S. Provisional Application No. 61/473,108 entitled "System and Method of Authentication Using a Re-Writable Card Verification Value" filed Apr. 7, 2011, both of which are hereby incorporated in their entireties by reference herein.

BACKGROUND

Transaction cards such as debit, credit or stored value cards are often used by account holders to purchase items or services or to obtain funds. Account holders often prefer the convenience of using such cards over carrying cash.

Transaction cards typically have a magnetic strip located on the back of the card which stores information for authenticating and processing transactions conducted with the card. However, fraudsters are sometimes able to skim the stored information on the card and use the skimmed information to create fraudulent cards for fraudulent transactions. Various locations may be compromised, for example, gas stations or other public card-transaction machines. The financial institution may detect suspicious transactions and notify the account holder, or the account holder may notify the financial institution regarding the fraudulent transactions. By that time, however, the fraudulent transactions have already been approved and the funds have already been taken from the account holder's account. In some cases, the financial institution is able to determine in advance that the information may have been fraudulently skimmed from the transaction card. In such situations, the financial institution is able to invalidate the card and issue a new card to the account holder. However, the account holder may have to wait a few days for a new card, and the delay in receiving a replacement card can be inconvenient for the account holder.

SUMMARY

Embodiments of the method for authentication can include determining that security of a card has been compromised during a first card transaction. The method may include generating a card verification value. Embodiment of an automated teller machine may write the card verification value to the card during a second card transaction, and the second card transaction occurring after the first card transaction. The financial institution system may detect an attempted fraudulent transaction associated with the card, the fraudulent transaction being attempted by a fraudster who obtained access to information obtained when the security of the card was compromised during the first transaction. The financial institution system may disallow the fraudulent transaction.

Embodiments of a transaction card can include a magnetic media that is configured to store card verification values. In one embodiment of the transaction card during a first operative state, the magnetic media has a first card verification value stored on it. In one embodiment of the transaction card in a second operative state, the magnetic media has a second card verification value stored on it. The second card verification value can replace the first card verification value, and the second card verification value being written to the magnetic media by an automated teller machine. The first card verification value authenticates the card in the first operative state and the second verification value authenticates the card in the second operative state.

Embodiments of a transaction card method for card security can include writing a temporary card verification value on the card and changing the temporary card verification value to another temporary card verification value during a transaction using automated teller machine.

Embodiments of a method of authenticating a transaction with a transaction card can include causing an automated teller machine to replace a card verification value with an updated card verification value written to the card during a first transaction at the automated teller machine, wherein the updated card verification value is written to the card while inserted into the automated teller machine and when a re-write condition is present. The re-write condition can be one of: a request from an account holder, a determination that the security of the card has been compromised during a prior transaction, a predetermined time interval has lapsed, a predetermined number of transactions have occurred during which the card verification value was not rewritten since a previous time the card verification value was rewritten, and according to a predetermined geographical parameter. The method may include storing the updated card verification value as a current value in a verification value database. The method may include receiving a card verification request related to a second transaction from a merchant or an automated teller machine. The method may further include authenticating, using verification logic, the second transaction by determining whether the card verification value for the second transaction matches the current value stored in the verification value database.

Embodiments of a system can include an automated teller machine having a card reader/writer, a verification code generator; and authentication logic accessible by the automated teller machine and a card-reading transaction machine for authenticating a transaction using a transaction card. the verification code generator can be configured to generate a verification code. The automated teller machine can be configured to write a first generated verification code to the transaction card when the transaction card is inserted into the automated teller machine prior to a first transaction during which the security of the card is compromised. The automated teller machine can be further configured to write a second generated verification code to the transaction card when the transaction card is inserted into the automated teller machine after the first transaction, upon determination that the security of the card has been compromised during the first transaction. The authentication logic can be configured to detect an attempted fraud during a second transaction, the attempted fraud being detected by comparing the card verification value for the second transaction with the second generated verification code written to the card when inserted into the automated teller machine.

Embodiments of a system can include an automated teller machine, a computer server system comprising one or more networked computer servers having machine-readable media, and program logic stored on the machine-readable media that, when executed by the servers, causes the servers to perform the functions of the system. One of the automated teller machine and the computer server system can include a verification code generator configured to generate a verification code. The automated teller machine can be configured to write a first generated verification code to the transaction card when the transaction card is inserted into the automated teller machine prior to a first transaction during which the security of the card is compromised. The automated teller machine can be configured to write a second generated verification code to the transaction card when the transaction card is inserted into the automated teller machine after the first transaction, upon determination that the security of the card has been compromised during the first transaction. The program logic can include network interface logic to connect the computer server system to the automated teller machine and a merchant transaction machine. The program logic may further include authentication logic configured to detect an attempted fraud during a second transaction, the attempted fraud being detected by comparing the card verification value for the second transaction with the second generated verification code written to the card when inserted into the automated teller machine.

DETAILED DESCRIPTION OF EXAMPLE EMBODIMENTS

Figure 1:
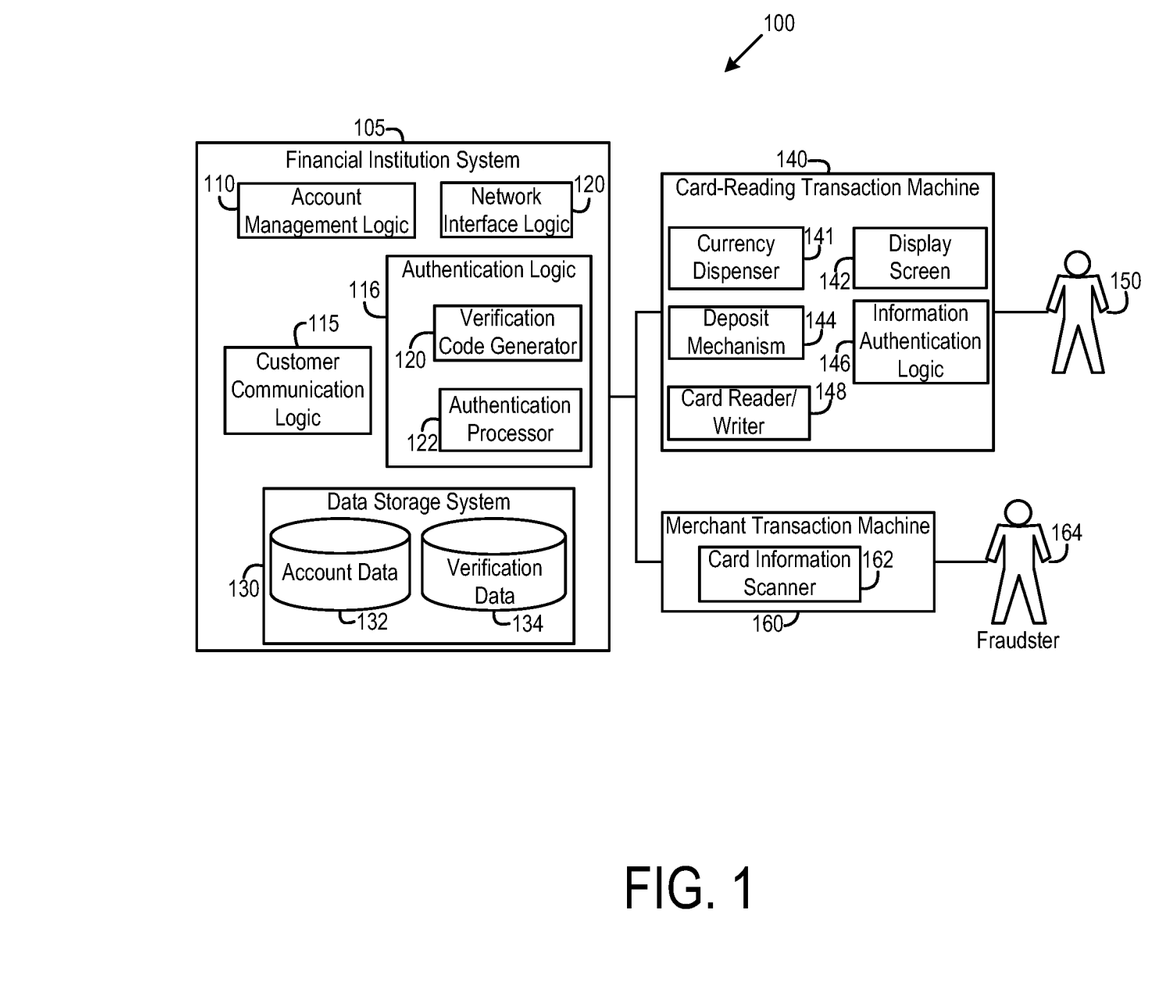
FIG. 1 is a schematic diagram of a card-reader transaction machine and a merchant transaction machine that communicates with a financial institution system.

Referring to FIG. 1, FIG. 1 shows a system 100 according to an example embodiment. The system 100 may include a financial institution computer system 105 that may include, among other systems, account management logic 110, customer communication logic 115, authentication logic 116, network interface logic 120, and data storage system 130. The system 100 may also include a card-reading transaction machine 140 and merchant transaction machine 160. The system 100 may be accessed by an account holder 150 who seeks authorization for a transaction.

In an example embodiment, the financial institution system 105 may be provided or controlled by a financial institution, such as a bank, and the users may be the customers or account holders of the financial institution that access the system 105 through tellers at retail bank branches, through the Internet, or in another manner such as a card-reading transaction machine. The customers may, for example, access system 105 through a card-reading transaction machine 140 or merchant transaction machine 160.

In the example where system 105 is provided by a financial institution, account management logic 110 may further include stored program logic that performs account processing, statement generation, account status, and funds transfers. In practice, the financial institution system 105 may include server computing systems, for example, comprising one or more networked computer servers having machine readable media. The logic described herein may therefore be implemented as program logic that is stored on the machine-readable media and that, when executed by the server(s), causes the servers to perform the operations described herein. The account management logic 110 may store data related to the account in account database 132.

Customer communication logic 115 can be configured to communicate with the customer by various means. For example, if the financial institution suspects that the transaction card information has been skimmed, the customer communication logic 115 may send a message to the account holder. One embodiment of the customer communication logic 115 may request that the account holder re-authenticate the transaction card. As described in greater detail below, re-authentication may involve the account holder inserting the transaction card to a card-reading transaction machine 140. Upon receiving the transaction card, the card-reading transaction machine 140 may then write a new card verification value to the magnetic stripe of transaction card. Embodiments of the customer communication logic 115 may transmit messages to an account holder for various other reasons as well. The customer communication logic 115 may use e-mails, mobile text messages, voicemails, or other types of methods of communications to send messages to the account holder 150.

The authentication logic 116 may authenticate information received from the card-reading transaction machine 140 to approve or reject a transaction. The authentication logic 116 may approve or deny authentication for transaction data sent by merchants and card-reading transaction machines.

Authentication logic 116 may include a verification code generator 120 and authentication processor 124. Verification code generator 120 may generate verification values to be written on the magnetic stripe of transaction cards. In one embodiment, the verification code generator 120 may generate verification values each time the card-reading transaction 140 requests authentication. In another embodiment, the verification code generator 120 may generate verification values each time the card-reading transaction 140 requests authentication, for example, when it is suspected that the security of the information stored on the transaction card has been compromised. The verification value may be generated using a pseudo random number generator or other suitable mechanism. The present time, geographic location of the automatic teller machine or other values may be used as a seed value for the pseudo random number generator.

In another embodiment, the verification code generator 120 may be located in the card-reading transaction machine 140 and the verification value may be generated at the card-reading transaction machine 140. In this embodiment, once the verification value is generated and written on the transaction card, the verification value may be sent to the financial institution system 105 to be stored in verification value database 134.

The authentication processor 122 authenticates a user as being a valid account holder associated with the transaction card and the corresponding account at the financial institution. As previously indicated, when a transaction is initiated, the person that initiates the transaction may or may not be the valid account holder. The authentication processor 122 may be a comparator that compares the current verification value stored in the verification value database 134 with the verification value read by the card-reading transaction machine 140. If the current verification value stored in the verification value database 134 matches the verification value read by the card-reading transaction machine 140, then the authentication logic 116 may approve the transaction. If the verification value does not match the latest verification value stored in the verification value database 134, then the proposed transaction from the card-reading transaction machine 140 may be disallowed.

Network interface logic 120 may be used to connect the computing system 105 to communicate with other systems such as a card-reading transaction machine 140 and a merchant transaction machine 160. An embodiment of the network interface logic 120 may be configured to communicate with the card-reading transaction machine 140 over a proprietary encrypted network. In another embodiment of the network interface logic 120 may be configured to communicate with the card-reading transaction machine 140 over a public encrypted network. In other embodiments, the network interface logic 120 may connect to the Internet to permit account holders to access the financial institution computing system 105 through an on-line banking area of a website of the bank. Network interface logic 120 may also comprise other logic that is configured to provide an interface for other types of devices such mobile devices that includes cell phones, smart phones, fax machines, automated teller machines (ATMs), and server-based computing systems.

The data storage system 130 may include account database 132 and verification value database 134. The verification value database 134 stores various card verification values generated by the verification code generator 120. In particular, the verification value database 134 may store current and past verification values for each card associated with each account holder at the financial institution. The verification value database 134 may be accessed by the authentication processor 124 to verify the verification value received from the card-reading transaction machine 140. The authentication processor 124 may verify that the current verification value stored in the magnetic strip on the card and the current verification value stored in the verification value database 134 are the same.

The verification value database 134 may maintain a log of all the verification values that were written on the transaction cards, including when each particular value was written on the card and when that value was replaced on the card. Additionally, in an example embodiment, the account database 132 maintains account information for each account, including a transaction history for each account. Accordingly, the information stored in the account database 132 and the verification value database 134 may be used to determine the location where a security breach occurred. For example, if there have only been two transactions during the time period of a particular card verification value, the breach of security must have occurred at one of the two transaction locations. If the security of multiple transaction cards has been breached, then a search for common locations may be performed to determine the location of the security breach. For example, if ten transaction cards have been compromised, and all ten of the account holders went to the same gas station, then it may be surmised that the gas station is the common location between the various security breaches.

The card-reading transaction machine 140 may, for example, be an automated teller machine, a point of sale device, or other device. For example, in the case of an automated teller machine, card-reading transaction machine 140 may include a currency dispenser 141, display screen 142, deposit mechanism 144, information authentication logic 146, and card reader/writer 148. In the case of a point of sale device, the transaction machine 140 may include a display screen 142 and a card reader/writer 148. Other hardware may also be included, such as a keypad or buttons for receiving user inputs. The point of sale device may, for example, be used at a merchant to pay for goods or services that are being purchased. These machines identify the customer by reading the magnetic stripe on the back of the transaction card. The magnetic media on the transaction card may store data such as, a personal identification number, account number, and one or more card verification values. In one embodiment, as described below, multiple card verification values are stored, at least one of which is a rewritable card verification value. The card-reading transaction machine 140 may be configured to erase the card verification value and write a new value when the card is inserted into the card-reading transaction machine 140 (e.g., each time the card is inserted, at predetermined intervals, only after fraud is suspected, or at other intervals). In some embodiments, it may be desirable to rewrite the card verification value more often to enhance security. In other embodiments, it may be desirable to rewrite the card verification value less often to avoid degradation of the magnetic strip. Additionally the financial institution verification data 134 may record the number of times the rewritable card verification value has been rewritten. In some embodiments, the number of times the rewritable card verification value has been changed may be recorded on the card and incremented each time the value is changed.

The currency dispenser 141 may dispense currency notes ("cash") to a customer 150 from the customer's financial institution accounts. The display screen 142 may allow the customer or account holder 150 to interact with the card-reading transaction machine 140 to process various transactions. The transactions may include extracting funds, purchasing an item, transferring funds from one account to another account, and so on. The display screen may be used to display various menus and choices to the account holder. One embodiment of the display screen 142 may be a touch sensitive screen.

The deposit mechanism 144 accepts envelop or envelop-free deposits of cash or checks. The information authentication logic 146 may receive input from the card reader/writer 148 and authenticate whether a pin received at the ATM is correct. The card reader/writer 148 may be configured to perform various tasks. For example, the writer 148 may write a rewritable card verification value each time a card is verified. The card reader/writer 148 may receive the card verification value from the verification value database 134 or from the verification code generator 120.

The information authentication logic 146 authenticates a user as being a valid account holder associated with the transaction card and the corresponding account at the financial institution. For example, the information read by the card reader/writer 148 can include account information and the personal identification number (PIN) that the account holder 150 provided. When the account holder 150 is asked for the personal identification number, the information authentication logic 146 may verify that the pin provided matches the information on the card provided by the account holder 150. The information authentication logic 146 may cooperate with the authentication logic 122 to authenticate the user. In other embodiments, the information authentication logic 146 may perform the functionality of the authentication logic 122.

The card reader/writer 148 scans information from the magnetic stripe ("magstripe") of a transaction card. The card reader/writer 148 may be configured to read information from a credit card, debit card, ATM card, stored value card, or the like. While performing the read operation, the card reader/writer 148 may be configured to read the account information and the PIN associated with the card and the account. In an example embodiment, the card reader/writer 148 can perform a write operation. In particular, the card/writer 148 may write a card verification value to the magstripe of the card in a first transaction. Later, during another transaction, the card/writer 148 may write a new card verification value on the magstripe. The card/writer 148 may write a new card verification values each time the card is inserted into the card reading transaction machine, at predetermined intervals, only after fraud is suspected, or at other intervals. The card verification value may be written on the magstripe without the account holder being aware that the card verification value is being written on the card. The card reader/writer 148 may write only the new card verification value or, in another embodiment, the entire magstripe may be rewritten (even though much of the data is unchanged). As will be appreciated, in addition to the rewritable card verification value, other data may also be stored on the card, such as a card verification value that does not get updated.

The merchant transaction machine 160 may be compromised by a card information scanner 162 that belongs to a fraudster 164 or that has been breached by the fraudster. The card information that is read by the scanner 162 may include the rewritable card verification value that was written by the card-reader transaction machine 140. The fraudster 164 may attempt to create a fraudulent card using the information from the account holder's card. For example, when the account holder uses the card at a transaction machine, the fraudster may surreptitiously gain access to information read from the magstripe by the transaction and to the PIN entered by the account holder. The fraudster may then attempt to manufacture a second, fraudulent card that has a magstripe with information copied from the authentic card. One advantage of the system 100 is that a new verification value is written to the authentic card (ideally, before the fraudster has an opportunity to conduct a fraudulent transaction with the fraudulent card). When the new verification value is written, a corresponding update is made in the verification value database 134. Thus, when the fraudster attempts to use the fraudulent card, which contains the old card verification value, the financial institution system 105 is able to determine that the transaction is fraudulent and disallow the fraudulent transaction. In another embodiment, the financial institution system 105 may permit the fraudulent transaction to be approved in order to track down the fraudster 164 and trap the fraudster 164. In another embodiment, the financial institution system may provide the data regarding the fraudulent transactions to law enforcement agencies to aid in prosecuting the fraudster 164.

The PIN and the rewritable card verification value cooperate to authenticate the user and the card. The PIN authenticates the user because the user is required to enter the PIN using a keypad or other input device at the transaction machine. The PIN may be a number that is chosen by the valid account holder. Ideally, the PIN is known only to the valid account holder. If the person using the card at the transaction machine is not the valid account holder, it is unlikely the person will be able to enter the correct pin. The card verification value authenticates the card because the correct value must be read from the card. If the card being used at the transaction machine is not encoded with the correct card verification value, then that indicates that the card is not the authentic card for the account held by the account holder. Generally, the card verification value is automatically read from the card by the card reader as opposed to be entered by the user. Unlike the PIN, which may often be selected by the account holder, the card verification value may be selected by the financial institution. Indeed, the valid account holder may not know the card verification value.

Figure 2:
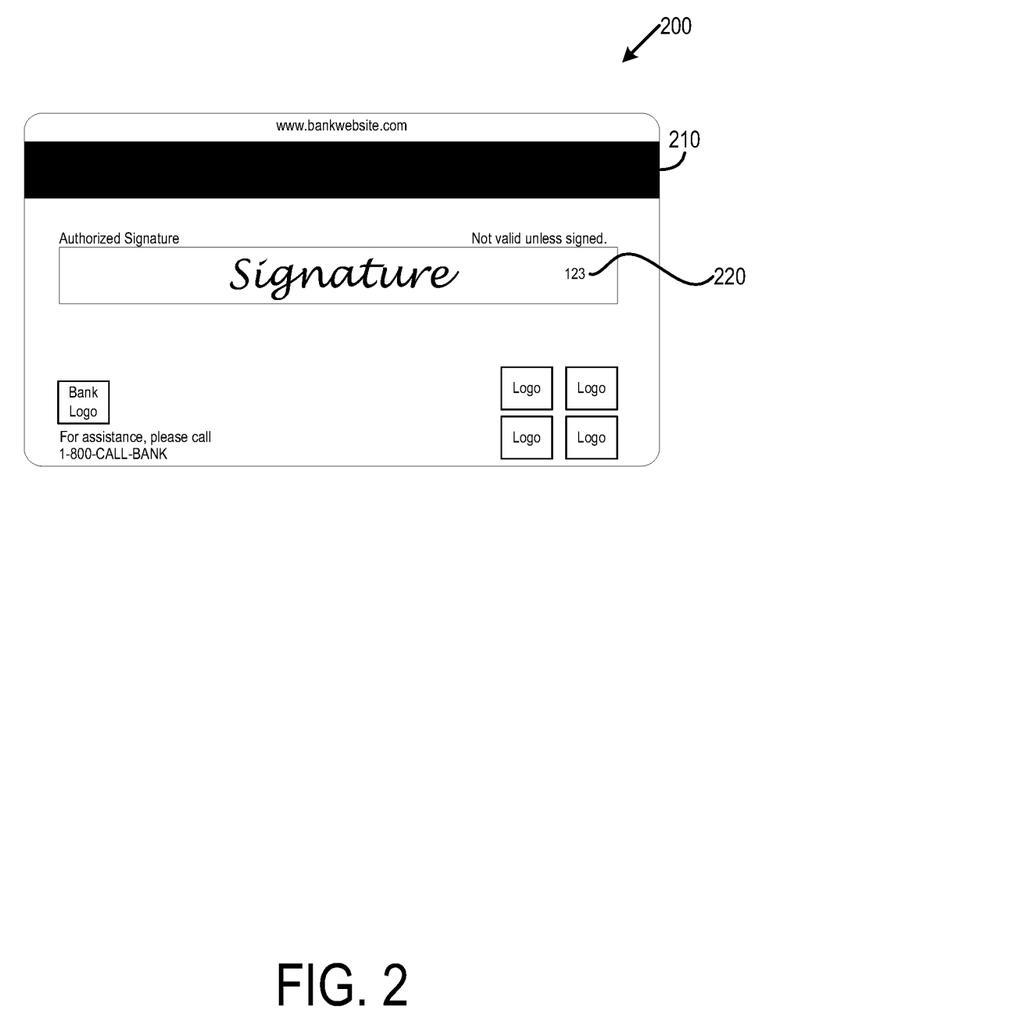
FIG. 2 shows an example transaction card that may be used by the system shown in FIG. 1.

Referring now to FIG. 2, FIG. 2 shows an example transaction card 200 that may be used by the system shown in FIG. 1. In one embodiment, the transaction card 200 is preferably a debit card. In other embodiments, the transaction card 200 can be a credit card, stored value card or another type of card. In particular, FIG. 2 shows the back of the transaction card 200 including a magnetic strip 210 and a permanent card security code 220 imprinted on the signature line. In one embodiment, in compliance with current industry standard ISO/IEC standard 7811, the magnetic stripe 210 may have three magnetic tracks: Track one may store 210 bits per inch and hold 79 characters in a 6-bit plus one parity bit of read only format. In another embodiment, track two can store 75 bits per inch and hold 40 characters in a 4-bit plus one parity bit format. In another embodiment, track three can store 210 bits per inch and hold 107 characters in a 4-bits plus one parity bit format. Track three can be a read/write track and may include an encrypted PIN, country code, currency unit and an authorized amount per transaction. Other configurations are also possible. As mentioned above, a rewritable card verification value may be written on track three of the card. However, in other embodiments, tracks one and two may be used for the card verification value. The format of the data may vary by the issuing financial institution. The magnetic strip 210 may also include an additional security code also known as a CVV1 value. In one embodiment, the CVV1 value can be re-written by the automated teller machine. In another embodiment, an additional rewritable security code may be included on the card.

Also shown in FIG. 2 is the card security code 220 which is permanently written on the transaction card 200. The security code 220 is also sometimes known as the card verification data (CVD), card verification value (CVV or CVV2), card verification value code (CVVC), card verification code (CVC or CVC2), verification code (V-Code or V code) or card code verification, depending on the financial institution that issued the transaction card. Accordingly, the rewritable card verification value written on the magstripe may be used in addition to the security code 220. The security code 220 is also used for transactions where the user is not physically present at a location, for example, the security code 220 is used for internet based purchases and transactions. The rewritable card verification value on the magstripe may be encrypted and the card issuing financial institution may supply a key for the decryption cipher. In an example embodiment, the rewritable card value can be a three digit value. In other embodiments, the rewritable card value can be at least 4, 5, 6, 7, 8 or 12 digits. In other embodiments, other numbers of digits are used. In another embodiment, the rewritable card value may an alphanumeric value of varying lengths. For example, the length of the rewritable card value may be changed each time a value is written. In one example, the length of the rewritable card value may be incremented and/or decremented after the length of the rewritable card value reaches the preset number of digits. Accordingly, the length of the value can be used as an additional parameter for verification. For example, the length of new value may be compared to the length of the previous value to verify that the length of the new value is higher or lower than the previous value.

Figure 3:
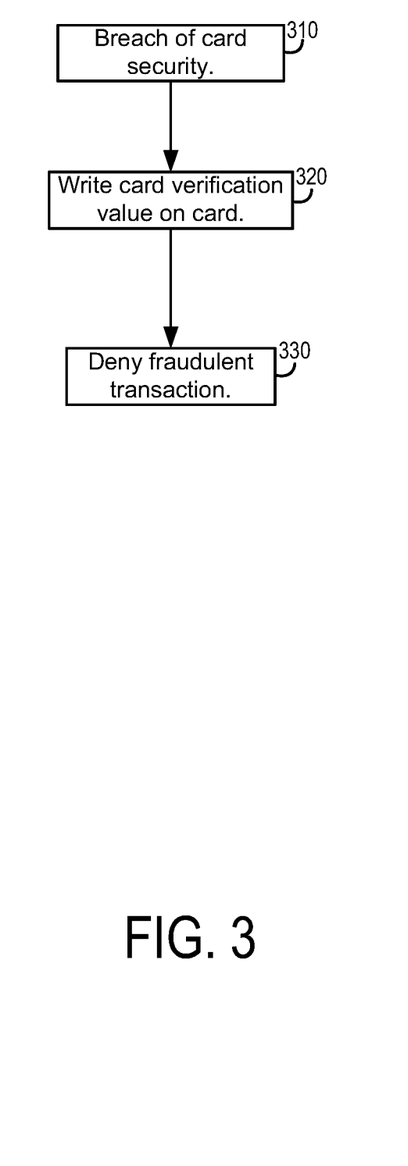
FIG. 3 is an example process that may be implemented using the system shown in FIG. 1.

Referring now to FIG. 3, FIG. 3 is an example overall process that the system shown in FIG. 1 may perform to deny a fraudulent transaction request. At step 310, a fraudster 164 may breach a transaction card's security. The breach in security may occur during a first transaction at a merchant transaction machine 160 or another location where the fraudster 164 installed a card information scanner (or "skimming" device) 162.

At step 320, during a second transaction, the account holder 150 may insert the transaction card into a card-reading transaction machine 140 and the card reader/writer 144 may write a new card verification value on magstripe of the transaction card. At step 330, the financial institution may deny a fraudulent transaction attempted by the fraudster 164. The financial institution system 105 may detect the attempted fraudulent transaction by comparing the card verification value provided by the fraudster with the latest card verification value written on the card. If the card verification value does not match, then financial institution can deny the fraudulent transaction. Since, at step 320, a new card verification value was written on the card after the information was stolen, the fraudster has an old card verification value.

Figure 4:
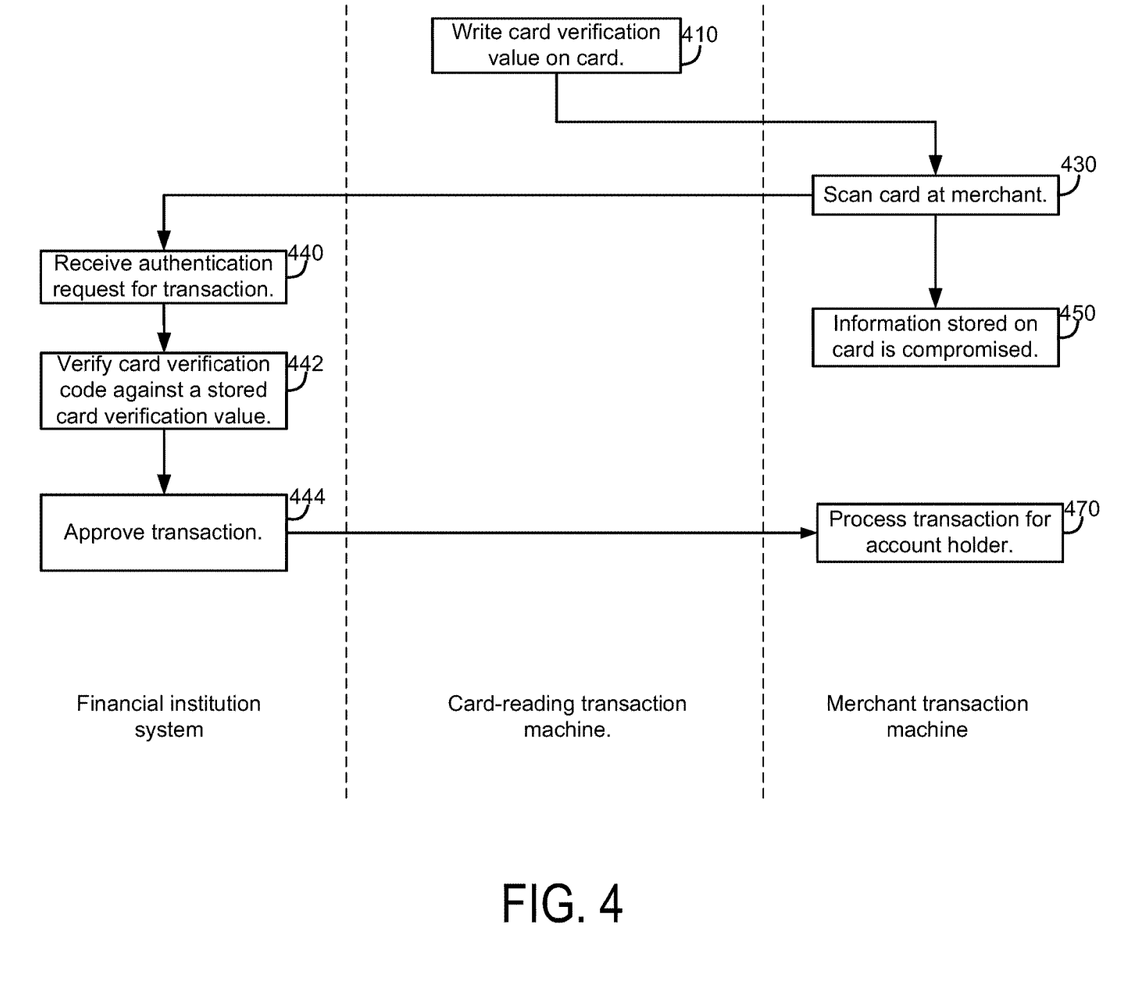
FIG. 4 is an example process that may be implemented using the system shown in FIG. 1 to process a transaction from FIG. 3.

FIG. 4 is an example process that may be implemented using the systems shown in FIG. 1 and discussed above at step 310. As shown in FIG. 4, step 410 may be performed by the card-reading automated machine. In the example embodiment shown in FIG. 4, steps 440, 442 and 444 may be performed by the financial institution computer system 105. As shown in FIG. 4, steps 430, 450 and 470 may be performed at the merchant transaction machine 140.

At step 410, the card-reading transaction machine may write a card verification value on the transaction card. The verification value is a temporary value stored on the magnetic stripe temporarily, for example, until the card is scanned again by the card-reading automated machine and a new verification value is written. At step 430, the account holder may swipe the magnetic stripe of the transaction card to request approval for the transaction. The merchant may send the scanned information from the card to the financial institution as an authentication request for the transaction at step 440. At step 442, the financial institution systems may verify the card verification value provided by the merchant matches the most recent stored card verification value that was written on the magnetic stripe of the card. If the card verification value matches the card verification value stored in the database 134, then, at step 444 the transaction is approved by the financial institution. Upon receiving the approval, the transaction for the account holder is processed at the merchant location at step 470. The information stored on the card may be skimmed by a fraudster 164 by a card information scanner at a merchant transaction machine 160, thereby breaching the card security at step 450.

Figure 5:
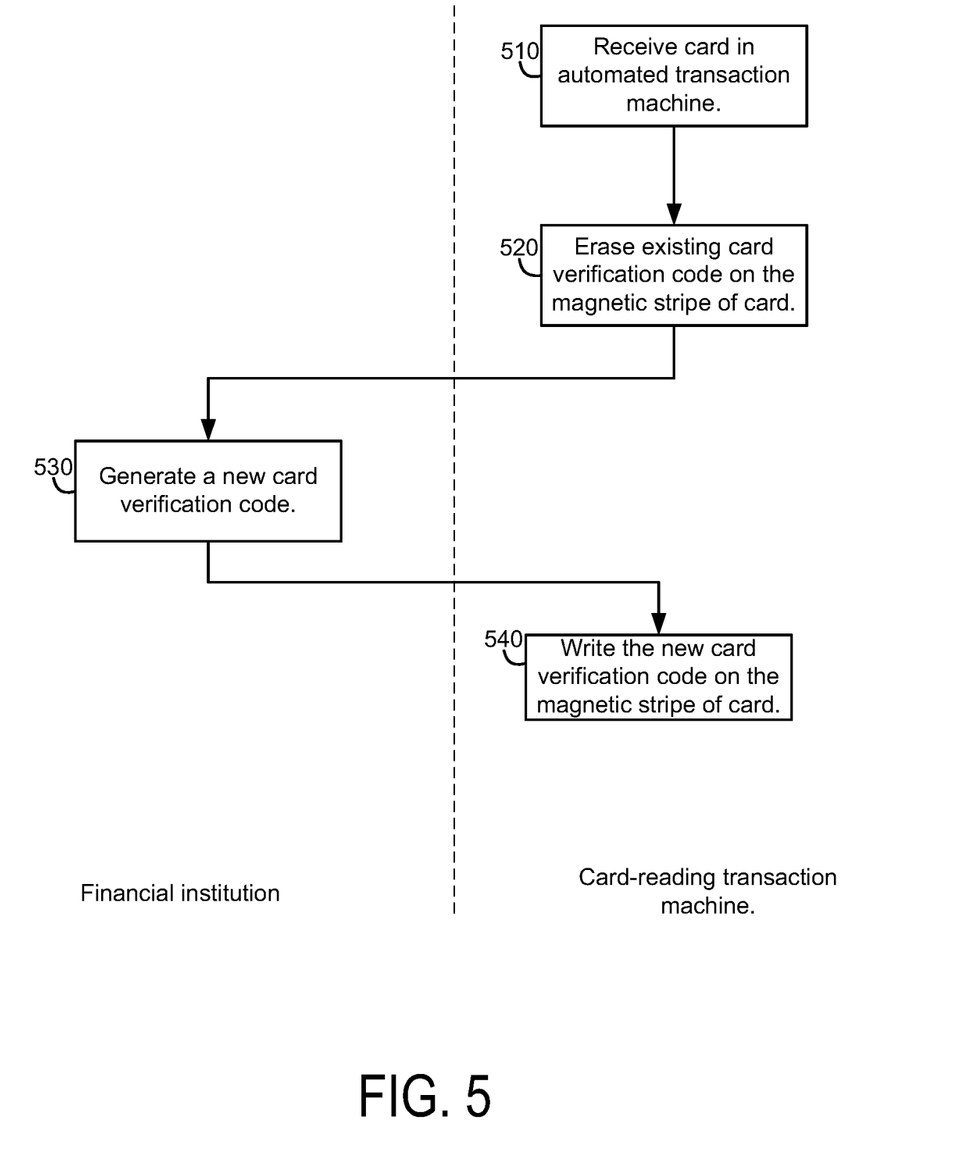
FIG. 5 is an example process that may be implemented using the system shown in FIG. 1 to write a new verification value on a magnetic stripe card.

FIG. 5 is an example process that may be implemented using the system shown in FIG. 1 to write a new card verification value on a magnetic stripe of a transaction card. At step 510, the card-reading transaction machine 140 may receive a transaction card. Upon receiving the transaction card, at step 520, the card-reading transaction machine may erase the existing card verification value on the magnetic stripe of the transaction card 200. At step 530, the financial institution system 105 may generate a new card verification value to be written on the transaction card. The card reader/writer 144 at the card-reading transaction machine 140 may write the new verification value on the magnetic stripe of the card. As previously indicated, the process shown in FIG. 5 may be repeated at various frequencies (e.g., each time the card is inserted, at predetermined intervals, only after fraud is suspected, or at other intervals).

In another embodiment, the transaction machine 140 can be configured by the authentication logic 116 to change the writable card verification value based on a geographic parameter or the location of the transaction machine 140. The geographic parameter can include, city, state, region, county or zip code. For example, if the transaction machine 140 is located in a geographic location that has a higher than the national average crime rate, then the authentication logic 116 may instruct the transaction machine 140 to change the writable card verification value every time an account holder uses the transaction machine 140. In another embodiment, if the transaction machine 140 is located in a geographic location that has a lower than the national average crime rate, then the authentication logic 116 may instruct the transaction machine 140 to change the writable card verification value less frequently than each time the account holder uses the transaction machine 140. For example, in the lower than average crime rate geographical area, the authentication logic 116 can instruct the transaction machine 140 to change the writable card verification value, on every $2^{nd}$, $3^{rd}$ and/or $4^{th}$ use of the transaction machine 140. Alternatively, the transaction machine 140 may be configured to change the writable card verification value on the card, on a weekly, bi-monthly, monthly, or yearly basis. In one embodiment, the authentication 116 may use a flag value to change the writable card verification value on each transaction machine 140 based on its geographical region. Accordingly, if the flag is set then the transaction machine 140 changes the writable card value or if the flag is unset then the transaction machine 140 does not change the writable card value. In another embodiment, when a financial institution is aware that there has been a security breach in a geographic area, the authentication logic 116 may set the flag value to change the writable card verification value on all ATMs in the effected geographical region.

In another embodiment, the authentication logic 116 determines whether the writable card value should be changed based on the card's transaction activity. For example, if the card was used at a location that has had security breach in the past, then the next time the card is inserted into the transaction machine 140, the writable card value is changed irrespective of the location of the transaction machine 140. In yet another embodiment, the account holder may be offered an option to change the writable card value at the transaction machine 140 by choosing a menu option that allows the account holder to change the value. In yet another embodiment, one account holder (a parent or business owner) may request that the writable card value of other account holder(s) (another family member or employees) be changed upon the other account holder reaching the transaction machine.

When the card verification value is rewritten to the card, the rewriting may occur as a result of normal usage of the card by the account holder (e.g., the account holder was going to withdraw cash anyway) or because the account holder has been specifically prompted to do so. For example, the financial institution may have reason to believe that the security of the card has been breached. In an example embodiment, the financial institution may instruct the account holder via e-mail to go the an automated transaction machine. In another embodiment, the financial institution may provide incentives to the account holder to go to the automated transaction machine. The incentives may include coupons, deals or an additional balance amount on an account. For example, if a particular gas station has been identified as a location where other cards have been compromised, then the financial institution may send out a communication to all account holders that conducted transactions at that gas station during a time period in which the other cards were compromised. Such a communication may prompt the account holders to proceed immediately to have their card scanned at a transaction machine. It may be easier and more convenient for the account holder to have the card scanned at a transaction machine than to wait for a new card to be mailed to them as a result of the security breach. It may also be noted that, in practice, some transaction machines may not be capable of writing a new card verification value to the card. For example, some transaction machines may only be equipped to read the magnetic strip and not write to the magnetic stripe. Accordingly, such a communication sent to the user may also include more specific instructions about what transaction machines may be used to have the card verification value rewritten to the card. For example, the communication may identify specific transaction machines that the account holder has used in the past that have such capabilities, may identify categories of transaction machines (e.g., automatic teller machines owned by the financial institution), and so on.

Figure 6:
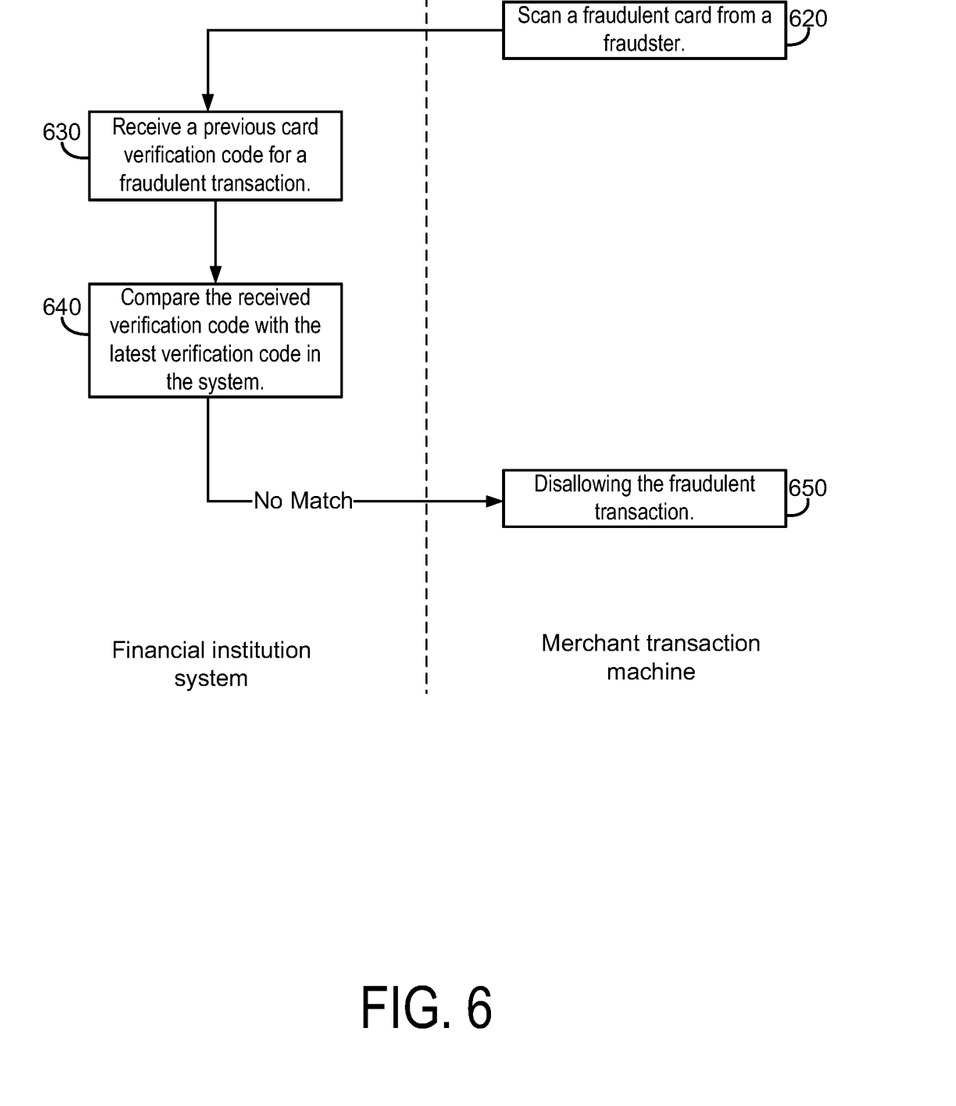
FIG. 6 is a method that may be implemented using the system in FIG. 1.

FIG. 6 is a method that may be implemented using the system in FIG. 1 and discussed above at step 330. As shown in FIG. 6, steps 620 and 650 can be performed by a merchant transaction machine 160 and steps 630 and 640 can be performed by a financial institution system 105. At step 620 the merchant transaction machine 160 may scan a fraudulent card with a previous card verification value. The scanned information may be sent to a financial institution system for authentication. At step 630, the financial institution system may receive a card verification value for a fraudulent transaction. The received value may be compared the latest verification value in the system at step 640. Because the card verification value has been updated, the received value is not the current card verification value stored in the database 130. Hence, at step 650, the received verification value does not match the latest verification value, and the financial institution system disallows the fraudulent transaction at the merchant transaction machine.

The embodiments of the methods and system have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any non-transitory machine-readable storage media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method of authenticating a financial transaction, comprising:
   determining that a first financial transaction using a transaction device has been initiated;
   determining that a non-zero number of financial transactions prior to the first financial transaction have occurred since a first verification value for the transaction device was updated;
   replacing the first verification value for the transaction device with a second verification value when a re-write condition is satisfied, the re-write condition being (i) that the first financial transaction using the transaction device has been initiated and (ii) that the non-zero number of financial transactions prior to the first financial transaction have occurred since the first verification value was updated;
   storing the second verification value as a current value in a verification value database;
   receiving a verification request related to a second transaction, the verification request including a third verification value; and
   authenticating, using verification logic, the second transaction based at least in part on determining that the third verification value is valid based on the second verification value stored in the verification value database.

2. The method of claim 1, further comprising determining that the first verification value has been compromised, and responsively implementing a verification value update at a next financial transaction.

3. The method of claim 2, further comprising instructing, responsive to the determination that the first verification value has been compromised, a transaction processing device at which the first financial transaction was initiated to present a user with an option to replace the first verification value.

4. The method of claim 2, further comprising transmitting, responsive to the determination that the first verification value has been compromised, a message to a user of the transaction device prompting the user to update the first verification value, the message being at least one of: an e-mail, a mobile text message, and a voicemail.

5. The method of claim 1, further comprising updating the first verification value further responsive to receiving a personal identification number that is validated based on a stored personal identification number associated with the transaction device.

6. The method of claim 1, wherein the non-zero number is determined based on a financial transaction history of the transaction device.

7. A system for authenticating a financial transaction, comprising:
   a processor;
   a verification code generator; and
   authentication logic for authenticating a transaction;
   wherein the verification code generator, when executed by the processor, is configured to cause the processor to replace a first verification value for a transaction device with an updated second verification value based on a geographic parameter, and store the updated second verification value as a current value in a verification value database, and
   the authentication logic, when executed by the processor, is configured to cause the processor to receive a verification request related to a financial transaction, the verification request including a third verification value, and authenticate the financial transaction based at least in part on determining that the third verification value is valid based on the updated second verification value stored in the verification value database.

8. The system of claim 7, wherein the authentication logic, when executed by the processor, is configured to cause the processor to receive a request to replace the first verification value, wherein the geographic parameter corresponds to a geographic location of the transaction processing device.

9. The system of claim 8, wherein:
   the verification code generator is further configured to update the current value of the first verification value stored in the verification value database at a selected frequency, wherein replacing the first verification value based on the geographic parameter comprises selecting the frequency based on the geographic parameter.

10. The system of claim 9, wherein selecting the frequency based on the geographic parameter comprises determining a crime rate corresponding to the geographic parameter, and selecting the frequency based on the determined crime rate.

11. The system of claim 9, wherein the frequency is a frequency of use of the transaction device to implement financial transactions.

12. The system of claim 9, wherein the frequency is a timing frequency.

13. The system of claim 9, wherein the geographic parameter is a flag set for a geographic region that includes the geographic location of the transaction processing device.

14. The system of claim 8, wherein the geographic parameter specifies at least one of a city, state, county, or zip code.

15. A system for authenticating a financial transaction, comprising:
   a computer server system comprising one or more networked computer servers having machine-readable media; and
   program logic stored on the machine-readable media that, when executed by the servers, causes the servers to perform the functions of the system, the functions comprising:
   replacing, as part of a first financial transaction, a first verification value for a transaction device with an updated second verification value, wherein the first verification value is replaced responsive to a determination that the first verification value has been compromised in a prior transaction;
   storing the updated second verification value as a current value in a verification value database;
   receiving a verification request related to a second financial transaction, the verification request including a third verification value; and
   authenticating, using verification logic, the second financial transaction based at least in part on determining that the third verification value included in the verification request is valid based on the updated second verification value stored in the verification value database.

16. The system of claim 15, wherein the program logic further comprises communication logic executable by the system configured to cause transmission of a message to a user of the transaction device responsive to the determination that the first verification value has been compromised, wherein the message prompts the user to update the first verification value, the message being at least one of: an e-mail, a mobile text message, and a voicemail.

17. The system of claim 16, wherein the communication logic is further configured to provide an interface for implementing the first financial transaction.

18. The system of claim 15, wherein updating the first verification value is performed further responsive to receiving a personal identification number that is validated based on a stored personal identification number associated with the transaction device.

19. The system of claim 18, further comprising communication logic configured to instruct a transaction processing device to present the interface along with an option to replace the first verification value.

20. The system of claim 18, wherein the communication logic is further configured to receive the updated second verification value from the transaction device.

* * * * *